(12) United States Patent
Lewis et al.

(10) Patent No.: US 9,457,540 B2
(45) Date of Patent: Oct. 4, 2016

(54) PANEL-INSERT ASSEMBLY AND METHOD

(71) Applicant: The Boeing Company, Chicago, IL (US)

(72) Inventors: Michael S. Lewis, Lake Forest Park, WA (US); Jessica Sakurai, Everett, WA (US); Brad J. Reeves, Everett, WA (US)

(73) Assignee: The Boeing Company, Chicago, IL (US)

( * ) Notice: Subject to any disclaimer, the term of this patent is extended or adjusted under 35 U.S.C. 154(b) by 132 days.

(21) Appl. No.: 14/445,242

(22) Filed: Jul. 29, 2014

(65) Prior Publication Data
US 2016/0031184 A1 Feb. 4, 2016

(51) Int. Cl.
| | | |
|---|---|---|
| B32B 3/12 | (2006.01) | |
| B32B 3/24 | (2006.01) | |
| F16B 5/01 | (2006.01) | |
| F16B 5/02 | (2006.01) | |
| F16B 37/00 | (2006.01) | |
| F16B 37/02 | (2006.01) | |
| B32B 7/08 | (2006.01) | |
| B32B 3/26 | (2006.01) | |
| F16B 37/12 | (2006.01) | |
| F16B 21/02 | (2006.01) | |

(52) U.S. Cl.
CPC . B32B 7/08 (2013.01); B32B 3/12 (2013.01); B32B 3/266 (2013.01); F16B 5/01 (2013.01); F16B 37/122 (2013.01); *B32B 2605/00* (2013.01); *B32B 2605/18* (2013.01); *F16B 5/02* (2013.01); *F16B 21/02* (2013.01); *F16B 37/00* (2013.01)

(58) Field of Classification Search
None
See application file for complete search history.

(56) References Cited

U.S. PATENT DOCUMENTS

| | | | | |
|---|---|---|---|---|
| 1,912,100 A | * | 5/1933 | Rosenberg | F16B 37/043 411/173 |
| 2,129,167 A | * | 9/1938 | Cunnington | B60R 13/02 411/339 |
| 2,400,072 A | * | 5/1946 | Burke | F16B 39/284 411/277 |
| 2,784,759 A | * | 3/1957 | Modrey | F16B 37/044 411/108 |
| 2,793,351 A | * | 5/1957 | Willans | H01R 33/7657 439/546 |
| 2,836,215 A | * | 5/1958 | Rapata | F16B 12/30 174/158 R |
| 2,967,593 A | * | 1/1961 | Cushman | F16B 5/01 16/2.1 |
| 3,008,552 A | * | 11/1961 | Cushman | F16B 5/01 16/2.1 |
| 3,042,156 A | * | 7/1962 | Rohe | F16B 5/01 16/2.1 |
| 3,061,054 A | * | 10/1962 | Simmonds | B25B 27/143 29/227 |
| 3,451,181 A | | 6/1969 | Neuschotz | |
| 3,621,557 A | * | 11/1971 | Cushman | B64C 1/12 29/460 |
| 3,678,980 A | * | 7/1972 | Gutshall | F16B 5/01 29/428 |
| 3,766,636 A | * | 10/1973 | Sygnator | F16B 5/01 29/525.02 |

(Continued)

FOREIGN PATENT DOCUMENTS

| | | | | | |
|---|---|---|---|---|---|
| DE | | 1246638 B | * | 8/1967 | E21B 17/08 |
| DE | | 3330297 A1 | * | 3/1985 | F16B 12/46 |

(Continued)

OTHER PUBLICATIONS

Machine Translation of JP 2009293272 A, Dec. 2009.*

(Continued)

*Primary Examiner* — Jeff Vonch
(74) *Attorney, Agent, or Firm* — Walters & Wasylyna LLC

(57) ABSTRACT

A panel-insert assembly including a panel having a core and a skin layer positioned over the core, wherein the skin layer defines an opening therein, and an insert positioned below the skin layer, wherein the insert is aligned with the opening.

14 Claims, 7 Drawing Sheets

(56) References Cited

U.S. PATENT DOCUMENTS

| | | | | |
|---|---|---|---|---|
| 3,884,006 | A | * | 5/1975 | Dietlein ................ B23P 19/062 411/360 |
| 4,303,361 | A | * | 12/1981 | Moryl et al. .......... F16B 37/042 411/108 |
| 4,341,053 | A | * | 7/1982 | Dettfurth .............. F16B 37/122 411/116 |
| 4,428,705 | A | * | 1/1984 | Gelhard ................ F16B 37/122 29/460 |
| 4,428,708 | A | * | 1/1984 | Burt ..................... B65G 1/0421 414/275 |
| 4,577,450 | A | * | 3/1986 | Large ........................ B64C 1/18 411/369 |
| 4,717,612 | A | * | 1/1988 | Shackelford ............. B32B 3/12 411/34 |
| 4,729,705 | A | * | 3/1988 | Higgins .................... F16B 5/01 411/174 |
| 4,800,643 | A | * | 1/1989 | Higgins .................... F16B 5/01 264/262 |
| 5,082,405 | A | | 1/1992 | Witten |
| 5,240,543 | A | | 8/1993 | Fetterhoff |
| 5,980,174 | A | * | 11/1999 | Gallagher ................ F16B 5/01 29/897.32 |
| 7,641,427 | B2 | * | 1/2010 | Zhang ...................... F16B 5/01 411/21 |
| 9,284,972 | B1 | * | 3/2016 | Reeves ................... F16B 21/02 |
| 2003/0039529 | A1 | * | 2/2003 | Ward .................... F16B 37/042 411/173 |
| 2007/0009712 | A1 | * | 1/2007 | Roth .................... B29C 70/088 428/172 |
| 2009/0258185 | A1 | * | 10/2009 | Holland ................. B29C 73/06 428/116 |
| 2012/0219355 | A1 | * | 8/2012 | Masuda ................... F16B 5/01 403/265 |
| 2012/0251235 | A1 | * | 10/2012 | Klaukien ................. F16B 5/01 403/404 |
| 2014/0286769 | A1 | * | 9/2014 | Otsu ........................ F02C 7/04 415/213.1 |
| 2015/0298423 | A1 | * | 10/2015 | Holemans ................ B32B 5/18 244/133 |
| 2016/0186441 | A1 | * | 6/2016 | Reeves ............... E04F 13/0801 52/582.2 |

FOREIGN PATENT DOCUMENTS

| | | | | |
|---|---|---|---|---|
| DE | 102006018051 | A1 | * 10/2006 | ............ B23B 41/06 |
| FR | 2 636 004 | | 3/1990 | |
| FR | 2985276 | A1 | * 7/2013 | ......... E04F 13/0835 |
| GB | 1 353 236 | | 5/1974 | |
| JP | 60063134 | A | * 4/1985 | |
| JP | 61100424 | A | * 5/1986 | |
| JP | 61261033 | A | * 11/1986 | |
| JP | 05116267 | A | * 5/1993 | |
| JP | 06126869 | A | * 5/1994 | |
| JP | 09164615 | A | * 6/1997 | |
| JP | 11198259 | A | * 7/1999 | |
| JP | 11348154 | A | * 12/1999 | |
| JP | 2007168397 | A | * 7/2007 | |
| JP | 2007332539 | A | * 12/2007 | |
| JP | 2007332983 | A | * 12/2007 | |
| JP | 2008133934 | A | * 6/2008 | |
| JP | 2008202260 | A | * 9/2008 | |
| JP | 2009097298 | A | * 5/2009 | |
| JP | 2009127344 | A | * 6/2009 | |
| JP | 2009293272 | A | * 12/2009 | |
| JP | 2011126296 | A | * 6/2011 | |

OTHER PUBLICATIONS

Extended European Search Report, EP 15 17 7477 (2015).

\* cited by examiner

PANEL-INSERT ASSEMBLY AND METHOD

FIELD

This application relates to sandwich panels and, more particularly, to sandwich panels having an insert, such as a threaded insert, connected thereto.

BACKGROUND

Sandwich panels are typically formed from a core sandwiched between two face sheets. The core may be relatively thick, yet lightweight, as compared to the face sheets. The face sheets may be relative thin, yet stiff. Therefore, sandwich panels typically possess relatively high strength and stiffness at relatively low weight. As such, sandwich panels are used in various applications, including aerospace applications, automotive applications, residential and commercial building applications and the like.

For example, sandwich panels are used in the construction of aircraft, such as commercial aircraft. Specifically, sandwich panels are used as the flooring, walls and bulkheads that define the passenger cabin of an aircraft. Therefore, such sandwich panels often are connected to the airframe of the aircraft such that loads applied to the sandwich panels are transferred to the airframe.

Connecting a sandwich panel to an airframe is typically effected with mechanical fasteners, such as bolts, that engage threaded inserts connected to the sandwich panel. The threaded inserts are typically potted (with an adhesive) into appropriately sized holes formed in the sandwich panel. The adhesives commonly used require long cure times, add undesired weight, and offer only limited pull strength protection since the load is transferred to the panel only through the adhesive. Also, care must be taken such that the threaded inserts are not placed too high in the holes, which may result in a gap being formed, or placed too low in the holes, which may result in unintentional pullout during tightening of the mechanical fastener.

Accordingly, those skilled in the art continue with research and development efforts in the field of sandwich panels.

SUMMARY

In one embodiment, the disclosed panel-insert assembly may include a panel having a core and a skin layer positioned over the core, wherein the skin layer defines an opening therein, and an insert positioned below the skin layer, wherein the insert is aligned with the opening.

In another embodiment, the disclosed panel-insert assembly may include a sandwich panel and an insert. The sandwich panel may include a core having a first major side and a second major side opposed from the first major side, a first skin layer positioned over the first major side, wherein the first skin layer defines an opening, and wherein the opening is elongated along an opening axis, and a second skin layer positioned over the second major side. The insert may be positioned below the skin layer, wherein the insert defines a threaded bore, and wherein the threaded bore is aligned with the opening.

In another embodiment, disclosed is a method for connecting an insert to a panel, the panel including a core and a skin layer, the method including (1) forming an opening in the skin layer; (2) inserting the insert through the opening such that the insert is positioned below the skin layer; and (3) rotating the insert relative to the opening.

Other embodiments of the disclosed panel-insert assembly and method will become apparent from the following detailed description, the accompanying drawings and the appended claims.

DETAILED DESCRIPTION

Figure 1:
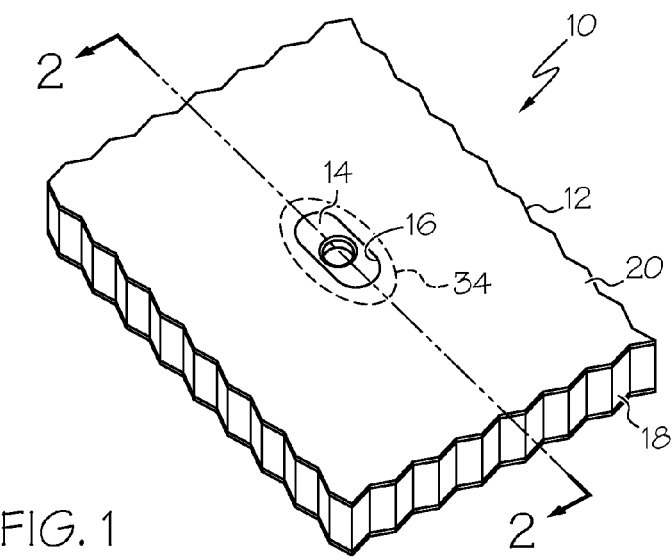
FIG. 1 is a perspective view of one embodiment of the disclosed panel-insert assembly.
Figure 2:
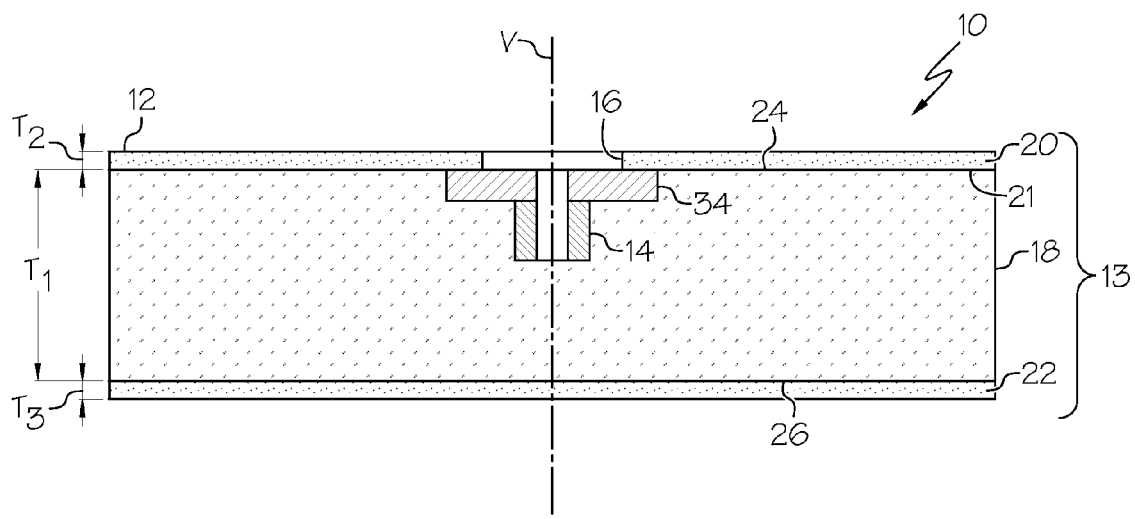
FIG. 2 is a cross-sectional view of the panel-insert assembly of FIG. 1.
Figure 3:
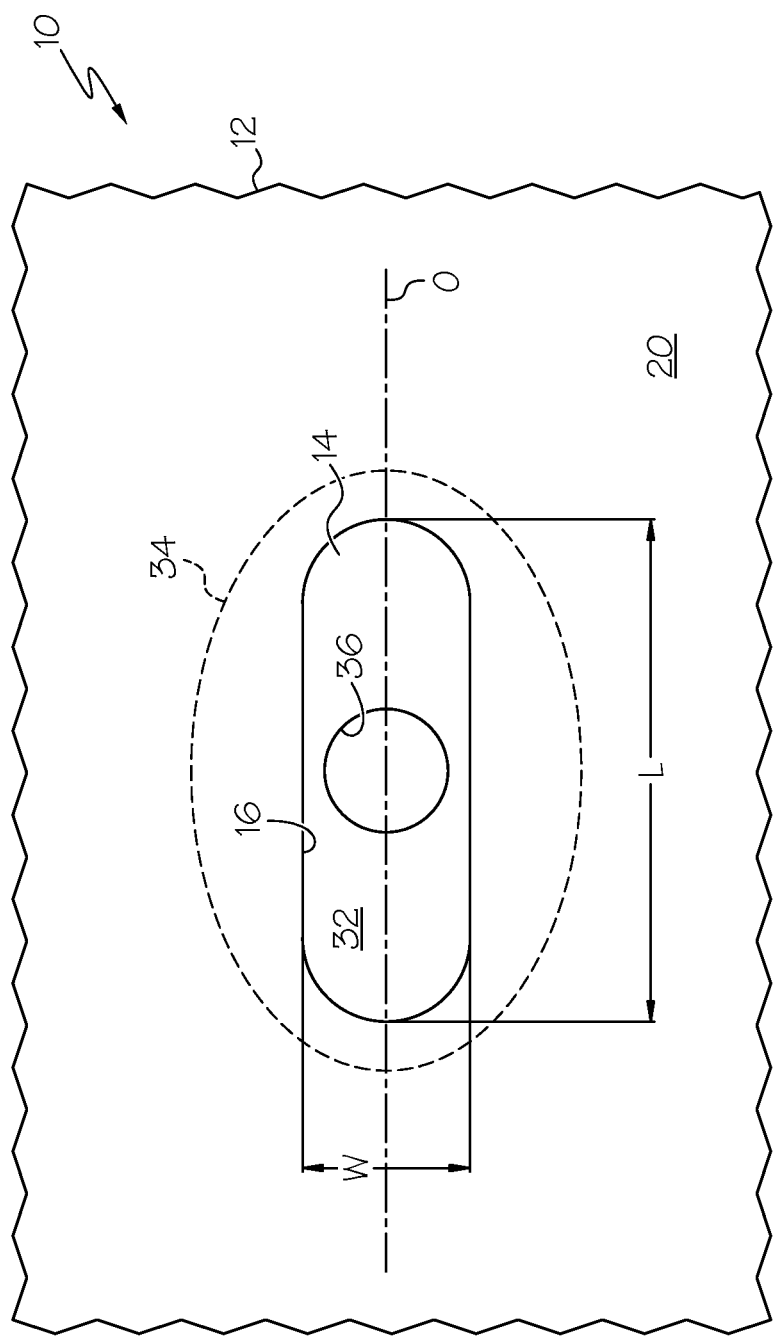
FIG. 3 is a top plan view of the panel-insert assembly of FIG. 1.

Referring to FIGS. 1-3, one embodiment of the disclosed panel-insert assembly, generally designated 10, may include a sandwich panel 12 and an insert 14. The insert 14 may be inserted through an opening 16 in the sandwich panel 12 in a manner that provides 360 degrees of contact between the insert 14 and the sandwich panel 12, thereby providing a strong connection therebetween.

As best shown in FIG. 2, the sandwich panel 12 may include a layered structure 13 that includes a core 18, a first skin layer 20 and a second skin layer 22. The insert 14 may be positioned below the first skin layer 20, thereby providing better load transfer between the insert 14 and the sandwich panel 12 (as opposed to a potted insert).

While the layered structure 13 of the sandwich panel 12 is shown with three layers 18, 20, 22, additional layers, such as additional core layers, additional skin layers and/or additional other layers, may be included without departing from the scope of the present disclosure. The second skin layer 22 may be optional and, therefore, may be omitted from the layered structure 13 of the sandwich panel 12 without departing from the scope of the present disclosure.

The core 18 of the sandwich panel 12 may include a first major side 24 and an opposed second major side 26. The first skin layer 20 may be connected (e.g., adhered, welded, braised, mechanically fastened etc.) to the first major side 24 of the core 18 and the second skin layer 22 may be connected (e.g., adhered, welded, braised, mechanically fastened etc.) to the second major side of the core 18, thereby sandwiching the core 18 between the first skin layer 20 and the second skin layer 22.

The cross-sectional thickness $T_1$ of the core 18 of the sandwich panel 12 may be relatively thick, as compared to the cross-sectional thicknesses $T_2$, $T_3$ of the first skin layer 20 and the second skin layer 22 (e.g., $T_1 > T_2$ and $T_1 > T_3$). For example, the cross-sectional thickness $T_1$ of the core 18 may be two or more times greater (e.g., five times greater) than the cross-sectional thickness $T_2$ of the first skin layer 20. However, the core 18 may have a relatively lower density (basis weight divided by cross-sectional thickness), as compared to the densities of the first skin layer 20 and the second skin layer 22.

Structurally, the core 18 of the sandwich panel 12 may be solid. However, lower densities may be achieved using a non-solid structure. As one specific, non-limiting example, the core 18 may be (or may include) a foam. As another specific, non-limiting example, the core 18 may be fluted or may include fluting. As yet another specific, non-limiting example, the core 18 may be (or may include) a honeycomb structure.

Compositionally, the core 18 may be formed from the same, similar or different materials than the first 20 and second 22 skin layers. However, the core may typically be a structure with less density than the skin layers 20, 22. As one specific, non-limiting example, the core 18 may be formed from a polymer (e.g., expanded polystyrene). As another specific, non-limiting example, the core 18 may be a honeycomb structure formed from a composite, such as a carbon fiber-reinforced composite or a fiberglass composite. As yet another specific, non-limiting example, the core 18 may be a honeycomb structure formed from a ceramic or metal, such as titanium, steel, aluminum or an aluminum alloy.

The first skin layer 20, which may be single ply or multi-ply, may be any material capable of being layered over and connected to the core 18. As one specific, non-limiting example, the first skin layer 20 may be a polymer, such as a polymer film, sheet or mesh. As another specific, non-limiting example, the first skin layer 20 may be a composite, such as a carbon fiber-reinforced composite or a fiberglass composite. As another specific, non-limiting example, the first skin layer 20 may be a ceramic. As yet another specific, non-limiting example, the first skin layer 20 may be a metal film, sheet or mesh.

The second skin layer 22, which may be single ply or multi-ply, may be formed from the same, similar or different material than the first skin layer 20. As one specific, non-limiting example, the second skin layer 22 may be a polymer, such as a polymer film, sheet or mesh. As another specific, non-limiting example, the second skin layer 22 may be a composite, such as a carbon fiber-reinforced composite or a fiberglass composite. As yet another specific, non-limiting example, the second skin layer 22 may be a metal film, sheet or mesh.

In FIG. 1, only a portion of a sandwich panel 12 is shown. Those skilled in the art will appreciate that the overall size and shape of the sandwich panel 12 may depend on the end application. For example, the sandwich panel 12 may be used to construct the passenger cabin of an aircraft and, therefore, may be sized and shaped accordingly. Additionally, while the sandwich panel 12 is shown in FIGS. 1-3 as being a substantially planar structure, non-planar sandwich panels 12 (e.g., curved sandwich panels 12) are also contemplated.

Still referring to FIGS. 1-3, the opening 16 in the sandwich panel 12 may be formed in the first skin layer 20. The opening 16 may extend through the cross-sectional thickness $T_2$ of the first skin layer 20. Therefore, the opening 16 may provide access to the core 18 positioned below the first skin layer 20. As is described in greater detail herein, the opening 16 may facilitate connecting the insert 14 to the sandwich panel 12 by insertion of the insert 14 below the first skin layer 20 by way of the opening 16.

The opening 16 in the first skin layer 20 of the sandwich panel 12 may have a maximum length L and a maximum width W that allow the insert 14 to pass therethrough. The width W of the opening 16 may be dictated by the cross-sectional thickness $T_4$ (FIG. 5) of the insert 14. The length L of the opening 16 may extend along an opening axis O, and may be greater than the width W (e.g., the opening 16 may be elongated), and the length L may be dictated by the major and minor dimensions $D_1$, $D_2$ of the insert 14.

As best shown in FIGS. 1 and 3, the opening 16 in the first skin layer 20 of the sandwich panel 12 may be obround in plan view. However, openings 16 of various shapes may be used without departing from the scope of the present disclosure. For example, while not shown in the drawings, the opening 16 may be rectangular, trapezoidal, irregular or the like.

The opening 16 in the first skin layer 20 of the sandwich panel 12 may be formed using various techniques. As one non-limiting example, the opening 16 may be formed by cutting out, such as with a blade, a portion of the first skin layer 20. As another non-limiting example, the opening 16 may be formed by machining, such as with a router, a portion of the first skin layer 20.

Figure 4:
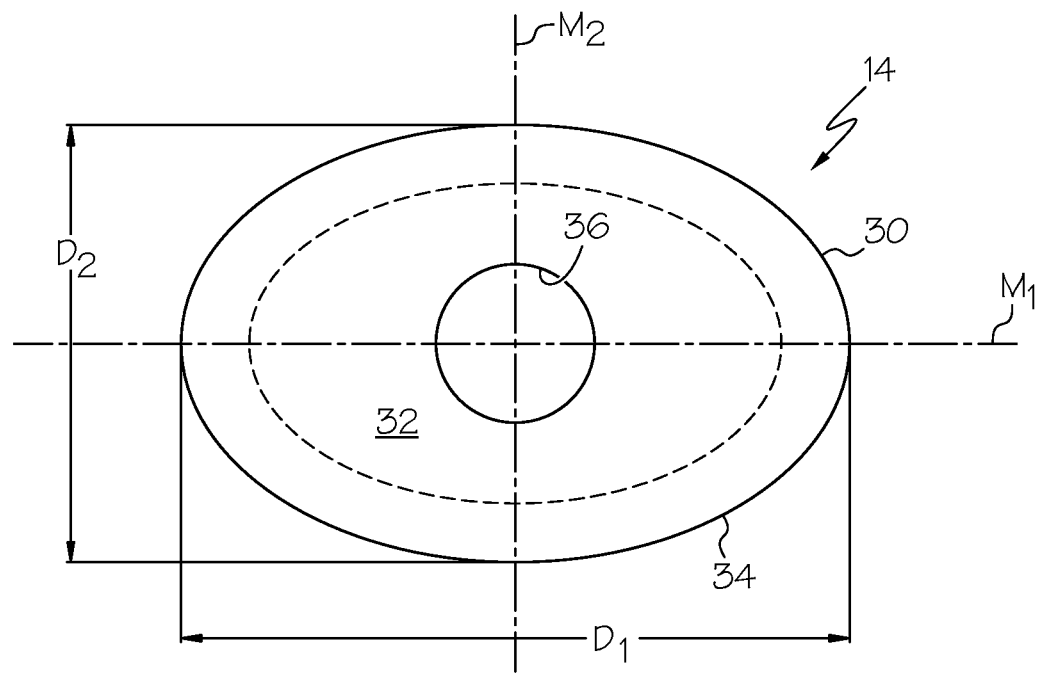
FIG. 4 is a top plan view of the insert of the panel-insert assembly of FIG. 1.
Figure 5:
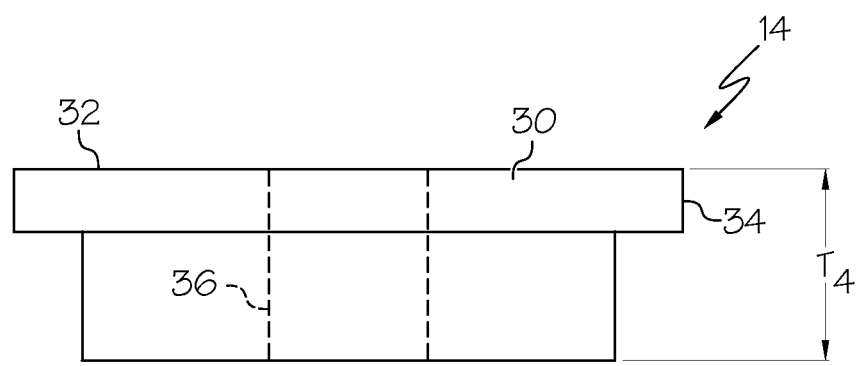
FIG. 5 is a side elevational view of the insert of FIG. 4.

Referring to FIGS. 4 and 5, the insert 14 may include a body 30 having an engagement surface 32 and an outer periphery 34. As best shown in FIG. 5, the engagement surface 32 of the body 30 of the insert 14 may be substantially planar, thereby allowing the engagement surface 32 to flushly abut the first skin layer 20 when the insert 14 is inserted into the sandwich panel 12 below the first skin layer 20, as shown in FIGS. 1-3. However, those skilled in the art will appreciate that the engagement surface 32 of the body 30 of the insert 14 may be shaped/contoured (e.g., curved) to closely correspond with the shape/contour of the first skin layer 20 below which the insert 14 is positioned.

Referring to FIG. 4, the body 30 of the insert 14 may include a major dimension $D_1$ extending along a major axis $M_1$ and a minor dimension $D_2$ extending along a minor axis $M_2$, wherein the major dimension $D_1$ is greater than the minor dimension $D_2$. For example, the major dimension $D_1$ may be about 1.1 to about 3 times greater than the minor dimension $D_2$, such as about 1.5 to about 2 times greater than the minor dimension $D_2$. Furthermore, the major dimension $D_1$ may be greater than the length L of the opening 16 in the first skin layer 20, as shown in FIG. 3, while the minor dimension $D_2$ may be substantially equal to or less than the length L of the opening 16 in the first skin layer 20.

In one particular implementation, the major axis $M_1$ may be perpendicular to the minor axis $M_2$, as shown in the drawings with an ellipse-shaped (in plan view) insert 14. However, it is also contemplated that the major axis $M_1$ may be transverse to, but not perpendicular to, the minor axis $M_2$.

While an ellipse-shaped insert 14 is shown in the drawings, those skilled in the art will appreciate that inserts 14 of various shapes may provide the disclosed major and minor dimensions $D_1$, $D_2$, and may be used without departing from the scope of the present disclosure. As one alternative example, the insert 14 may be a non-elliptical oval. As another alternative example, the insert 14 may be rectilinear (e.g., a rectangle). As yet another alternative example, the insert 14 may have an irregular and/or non-symmetric shape.

The body 30 of the insert 14 may define a bore 36 therein. The bore 36 may be sized and shaped to receive and engage a mechanical fastener, such as a screw, a bolt, a rivet or the like. In one particular implementation, the bore 36 of the insert 14 may be threaded to receive and engage a threaded fastener (e.g., a screw or a bolt).

Optionally, the portion of the body 30 surrounding the bore 36 may have a greater cross-sectional thickness $T_4$ than the rest of the body 30 to provide the bore 36 with greater depth. For example, the body 30 of the insert 14 may have a flanged or T-shaped profile, as shown in FIG. 5. At this point, those skilled in the art will appreciate that providing the insert 14 with a deeper threaded bore 36 may facilitate a stronger connection between the insert 14 and a threaded mechanical fastener.

The insert 14 may be formed from various materials or combination of materials. As one general, non-limiting example, the insert 14 may be formed from metal, such as steel. As another general, non-limiting example, the insert 14 may be formed from a polymer, such as polyethylene terephthalate. As another general, non-limiting example, the insert 14 may be formed from a combination of materials, such as a polymer body having a metallic threaded insert (defining the bore 36) connected thereto. For example, the metallic threaded insert may be press-fit into the polymer body. As yet another general, non-limiting example, the insert 14 may be formed from a combination of materials, such as a ceramic body having a metallic threaded insert (defining the bore 36) connected thereto. For example, the metallic threaded insert may be press-fit into the ceramic body. As one specific, non-limiting example, the insert 14 may be a steel, such as a stainless steel, nut plate.

As shown in FIGS. 1-3, the insert 14 may be connected to the sandwich panel 12 by inserting the insert 14 through the opening 16 in the first skin layer 20 such that the insert 14 is positioned below the first skin layer 20 (e.g., between the first skin layer 20 and the core 18). Once below the first skin layer 20, the insert 14 may be oriented such that the entire outer periphery 34 of the insert 14 is positioned vertically below (relative to the vertical axis V of the insert 14 shown in FIG. 2) the first skin layer 20 and radially outside (relative to vertical axis V of the insert 14) of the opening 16 in the first skin layer 20, thereby providing 360 degrees of contact between the engagement surface 32 of the insert 14 and the underside 21 of the first skin layer 20 of the sandwich panel 12.

Figure 6:
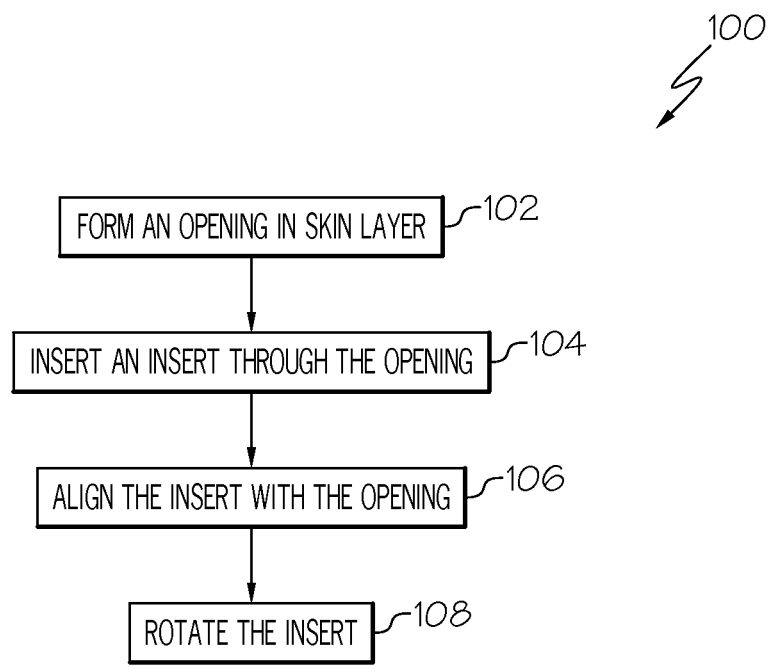
FIG. 6 is a flow chart depicting one embodiment of the disclosed method for connecting a threaded insert to a sandwich panel.

Also disclosed is a method for connecting an insert to a sandwich panel. One embodiment of the disclosed method is shown in FIG. 6 and is generally designated 100. The method 100 is described below with references to FIGS. 7-10. Additional steps may be included in the disclosed method 100 without departing from the scope of the present disclosure.

Figure 7:
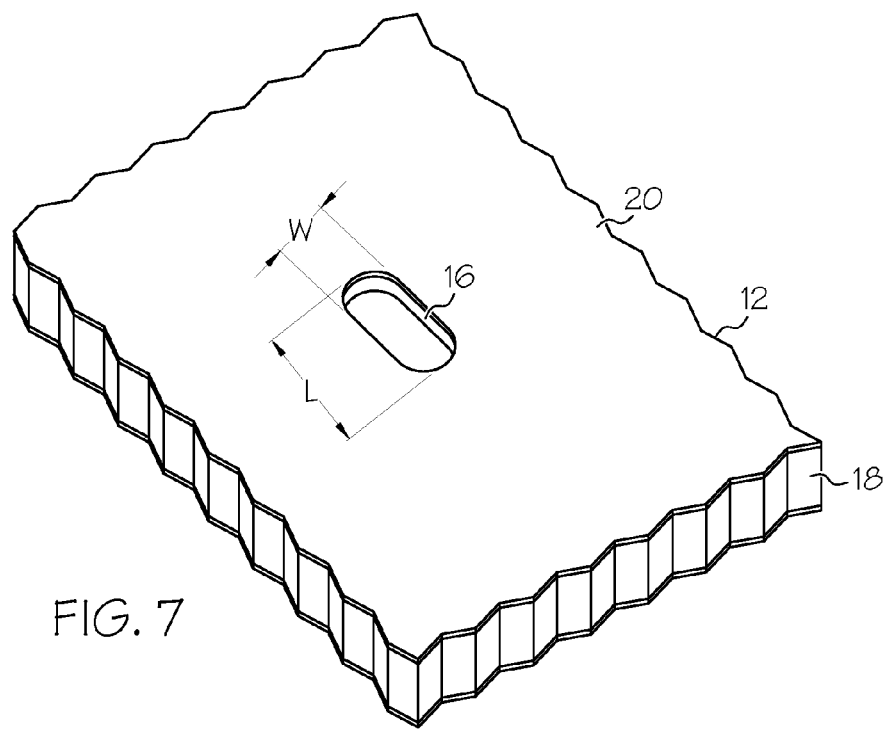
FIG. 7 is a perspective view of the opening forming step of the method shown in FIG. 6.

At Block 102, the method 100 may begin with the step of forming an opening 16 in the skin layer 20 of the sandwich panel 12, as shown in FIG. 7. The opening 16 may extend through the skin layer 20 (down to the core 18), and may have a length L and a width W. The opening 16 may be formed by cutting, machining or the like the skin layer 20 of the sandwich panel 12.

Figure 8:
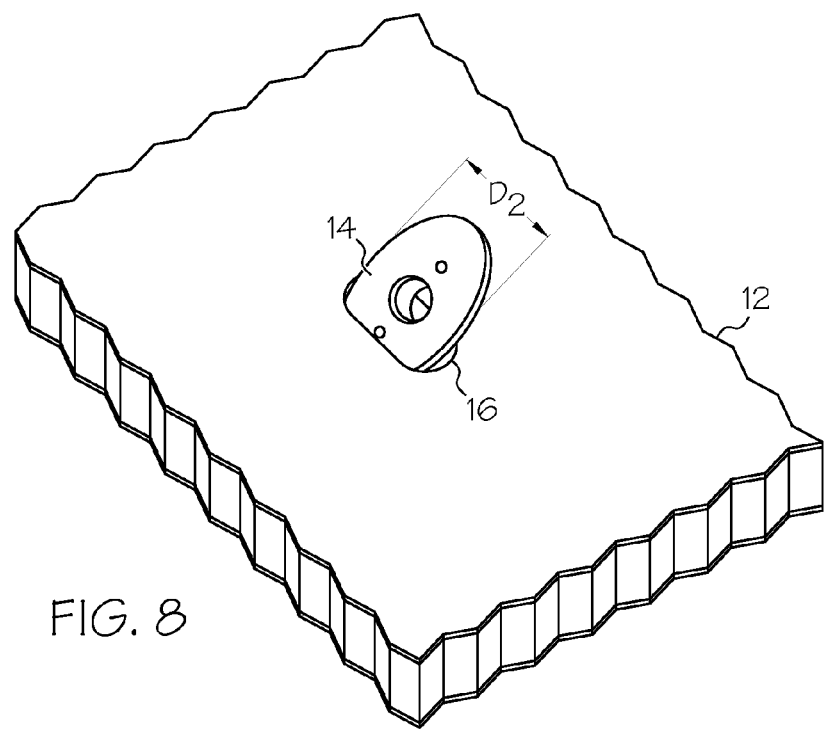
FIG. 8 is one perspective view of the inserting step of the method shown in FIG. 6.
Figure 9:
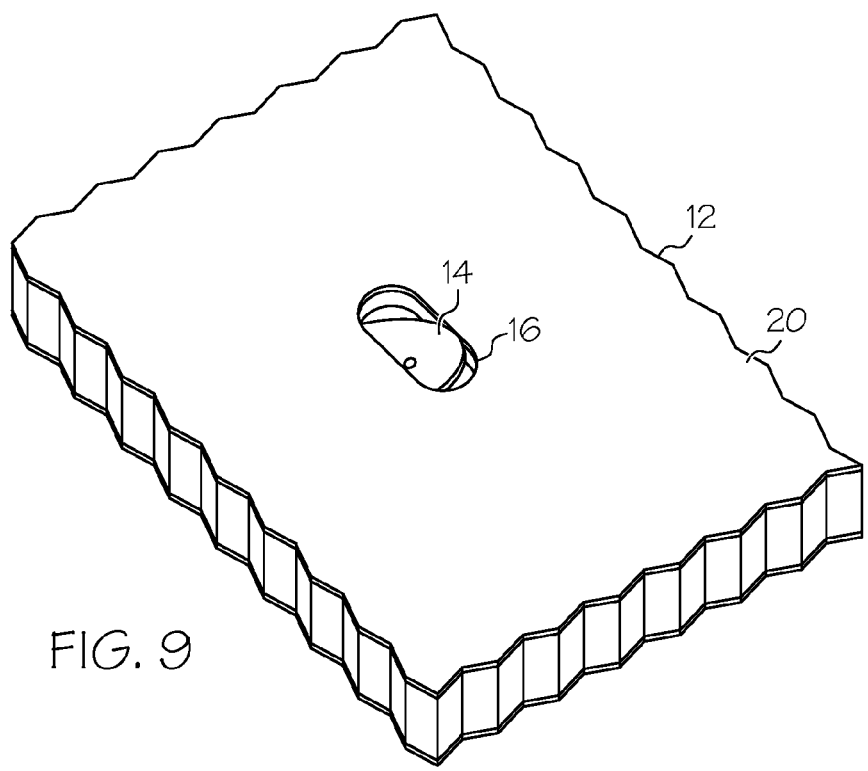
FIG. 9 is another perspective view of the inserting step of the method shown in FIG. 6.

At Block 104, the insert 14 may be inserted through the opening 16 in the skin layer 20 of the sandwich panel 12, as shown in FIGS. 8 and 9. To facilitate insertion of the insert 14, the insert 14 may be arranged such that the minor dimension $D_2$ of the insert 14 is aligned with the length L (FIG. 7) of the opening 16, thereby allowing the smaller, minor dimension $D_2$ of the insert 14 to pass through the opening 16.

The insert 14 may be inserted such that it is positioned below the skin layer 20 of the sandwich panel 12. In one optional variation, a portion of the skin layer 20 may be delaminated from the core 18 to facilitate receiving the insert 14 below the skin layer 20 (e.g., between the skin layer 20 and the core 18). In another optional variation, a portion of the core 18 may be removed (e.g., cut out) to form a void sized and shaped to accommodate the insert 14.

Figure 10:
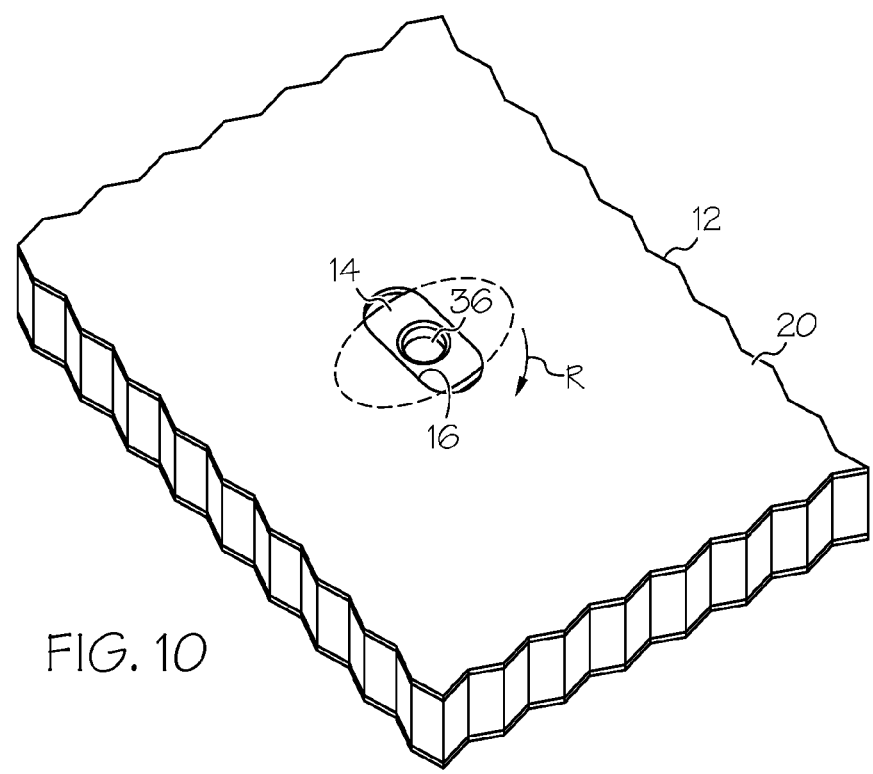
FIG. 10 is a perspective view of the aligning and rotating steps of the method shown in FIG. 6.

At Block 106, the insert 14 (particularly the threaded bore 36 of the insert) may be aligned with the opening 16 in the skin layer 20 of the sandwich panel 12, as shown in FIG. 10. For example, the insert 14 may define a bore 36, such as a threaded bore 36, and the bore 36 of the insert 14 may be vertically aligned (see vertical axis V in FIG. 2) with the opening 16 in the skin layer 20 of the sandwich panel 12.

At Block 108, the insert 14 may be rotated relative to the opening 16, as shown by arrow R in FIG. 10. The rotation may be made about the vertical axis V (see FIG. 2) such that the major dimension $D_1$ (see FIG. 4) of the insert 14 is aligned with the length L (see FIG. 3) of the opening 16, thereby providing 360 degrees of contact between the engagement surface 32 (FIG. 4) of the insert 14 and the underside 21 (FIG. 2) of the skin layer 20 of the sandwich panel 12. As one example, when the major axis $M_1$ is substantially perpendicular to the minor axis $M_2$, the rotating step (Block 108) may involve rotating the insert 14 ninety degrees about the vertical axis V. As another example, the rotating step may require rotating the insert 14 less than ninety degrees (or more than ninety degrees), such as when the insert 14 is nonsymmetrical.

Thus, in the final, rotated configuration, the major axis $M_1$ (FIG. 4) of the insert 14 may be aligned with (e.g., substantially parallel with) the opening axis O (FIG. 3) of the opening 16 in the sandwich panel 12, as shown in FIG. 1.

Figure 11:
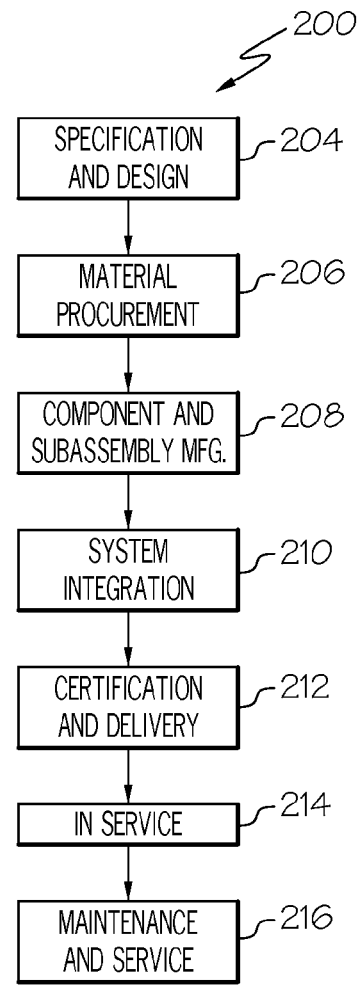
FIG. 11 is flow diagram of an aircraft manufacturing and service methodology.
Figure 12:
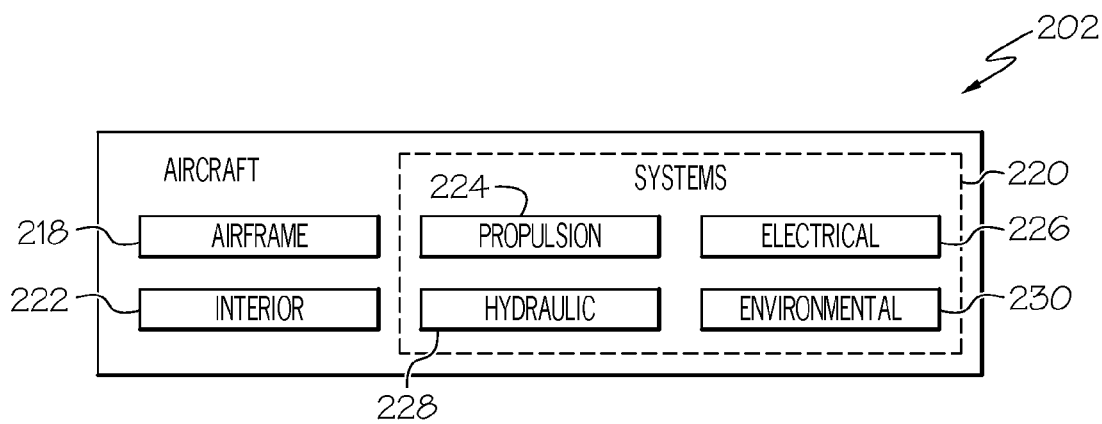
FIG. 12 is a block diagram of an aircraft.

Examples of the disclosure may be described in the context of an aircraft manufacturing and service method 200, as shown in FIG. 11, and an aircraft 202, as shown in FIG. 12. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 12, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included.

The disclosed panel-insert assembly 10 and method 100 may be employed during any one or more of the stages of the aircraft manufacturing and service method 200. For example, components or subassemblies corresponding to component/subassembly manufacturing 208, system integration 210, and or maintenance and service 216 may be fabricated or manufactured using the disclosed panel-insert assembly 10 and method 100. Also, one or more apparatus examples, method examples, or a combination thereof may be utilized during component/subassembly manufacturing 208 and/or system integration 210, for example, by substantially expediting assembly of or reducing the cost of an aircraft 202, such as the airframe 218 and/or the interior 222. Similarly, one or more of system examples, method examples, or a combination thereof may be utilized while the aircraft 202 is in service, for example and without limitation, to maintenance and service 216.

The disclosed system and method are described in the context of an aircraft; however, one of ordinary skill in the art will readily recognize that the disclosed service system may be utilized for a variety of different components for a variety of different types of vehicles. For example, implementations of the embodiments described herein may be implemented in any type of vehicle including, e.g., helicopters, passenger ships, automobiles and the like.

Although various embodiments of the disclosed panel-insert assembly and method have been shown and described, modifications may occur to those skilled in the art upon reading the specification. The present application includes such modifications and is limited only by the scope of the claims.

What is claimed is:

1. A panel-insert assembly comprising:
   a panel comprising a core and a skin layer positioned over said core, wherein said skin layer defines an opening that is elongated along an opening axis and comprises a maximum length; and
   an insert defining a vertical axis and comprising a body comprising a bore, wherein said body extends about said bore and defines an engagement surface, wherein said engagement surface comprises a solid, elongated shape having an outer periphery extending about said vertical axis, said outer periphery defining a major dimension extending along a major axis and a minor dimension extending along a minor axis, said minor axis being perpendicular to said major axis, and said major dimension being greater than said minor dimension and said minor dimension is less than or equal to said maximum length, wherein said insert is positioned vertically below said skin layer between said skin layer and said core, and is oriented relative to said opening such that said major axis is substantially parallel with said opening axis and said outer periphery is entirely radially outside of said opening.

2. The panel-insert assembly of claim 1 wherein said panel is a sandwich panel and further comprises a second skin layer, wherein said core is positioned between said skin layer and said second skin layer.

3. The panel-insert assembly of claim 1 wherein said bore is threaded.

4. The panel-insert assembly of claim 1 wherein said core comprises a honeycomb structure.

5. The panel-insert assembly of claim 1 wherein said opening is obround when viewed along said vertical axis.

6. The panel-insert assembly of claim 1 wherein said engagement surface is substantially planar.

7. The panel-insert assembly of claim 1 wherein said engagement surface flushly abuts said skin layer.

8. The panel-insert assembly of claim 1 wherein said major dimension is about 1.1 to about 3 times greater than said minor dimension.

9. The panel-insert assembly of claim 1 wherein said major dimension is about 1.5 to about 2 times greater than said minor dimension.

10. The panel-insert assembly of claim 1 wherein said body is ellipse-shaped.

11. The panel-insert assembly of claim 1 wherein said insert comprises a combination of materials.

12. A panel-insert assembly comprising:
   a sandwich panel comprising:
      a core having a first major side and a second major side opposed from said first major side;
      a first skin layer positioned over said first major side, wherein first skin layer defines an opening, and wherein said opening is elongated along an opening axis and comprises a maximum length; and
      a second skin layer positioned over said second major side; and
   an insert defining a vertical axis and comprising a body comprising a threaded bore, said body extends about said bore and defines an engagement surface, wherein said engagement surface comprises a solid, elongated shape having an outer periphery extending about said vertical axis, said outer periphery defining a major dimension extending along a major axis and a minor dimension extending along a minor axis, said minor axis being perpendicular to said major axis, and said major dimension being greater than said minor dimension and said minor dimension is less than or equal to said maximum length, wherein said insert is positioned vertically below said first skin layer between said first skin layer and said core, and is oriented relative to said opening such that said major axis is substantially parallel with said opening axis and said outer periphery is entirely radially outside of said opening.

13. The panel-insert assembly of claim 12 wherein said core comprises a honeycomb structure.

14. The panel-insert assembly of claim 12 wherein said major dimension is about 1.1 to about 3 times greater than said minor dimension.

* * * * *